United States Patent [19]
Muenchhausen

[11] 3,815,090
[45] June 4, 1974

[54] METHOD AND CIRCUIT ARRANGEMENT FOR AUTOMATIC RECOGNITION OF CHARACTERS WITH THE HELP OF A TRANSLATION INVARIANT CLASSIFICATION MATRIX

[75] Inventor: Meinolf Muenchhausen, Gauting, Germany

[73] Assignee: Siemens Aktiengesellshaft, Berlin & Munich, Germany

[22] Filed: Sept. 26, 1972

[21] Appl. No.: 292,288

[30] Foreign Application Priority Data

Sept. 27, 1971 Germany........................... 2148152

[52] U.S. Cl................. 340/146.3 MA, 340/146.3 H
[51] Int. Cl............................................. G06k 9/12
[58] Field of Search............340/146 R, 179/15BC, 340/146.3 H, 146.3 MA, 146.3 S, 340/146.3 Q; 179/15 BC

[56] References Cited

UNITED STATES PATENTS

| | | | |
|---|---|---|---|
| 3,705,981 | 12/1972 | Harmuth | 179/15 BC |
| 3,339,179 | 8/1967 | Shelton, Jr. et al. | 340/146.3 H |
| 3,341,814 | 9/1967 | Chow | 340/146.3 S |

OTHER PUBLICATIONS

Carl, "An Application of Walsh Functions to Image Class", Applications of Walsh Functions Symposium–1970 Proceedings, N.R.L. & U. of Maryland, 3–1970, Pp. 147–151.
Carl et al., "Playing the Identification Game with Walsh Functions," App. of Walsh Funct. Symposium–1971, Proceedings, N.R.L. & U. of Maryland, 4–1971, Pp. 203–209.

*Primary Examiner*—Paul J. Henon
*Assistant Examiner*—Leo H. Boudreau
*Attorney, Agent, or Firm*—Hill, Gross, Simpson, Van Santen, Steadman, Chiara & Simpson

[57] ABSTRACT

A method and apparatus for automatic character recognition of characters which may be varied, even within a class of significance, according to shape, size and position in a raster of a column-wise scanning field. The sensed data is transformed according to given rules in several steps to provide a translation invariant classification matrix from which a class of significance of the character is derived for which the highest probability is given through the use of values of individual elements. The scanning signals obtained during the scanning of the scanning field, and corresponding to the black value of the scanning elements and arranged in the scanning field in columns are one-dimensionally transformed with a set of orthogonal Walsh functions which has been extended over phase shifted sequences in such a way that the transformation result of a number of scanning signals forms a value of a one-dimensionally transformed image matrix. The transformed image matrix is again transformed in the same manner with a transposed set of applied Walsh functions and therefore results in a two-dimensionally transformed image matrix. From the two-dimensionally transformed image matrix a classification matrix, denoted as a sequence spectrum, is embodied in such a way that partial ranges merely due to phase shifted sequences of Walsh functions of equal order, and limited by lines and columns of equal order, are combined in the two-dimensionally transformed image matrix by means of maximum value formation. Absolute values are found from the latter, as well as all remaining values of the two-dimensionally transformed image matrix, and are transferred as spectrum values into the sequence sprectrum. Combinations of the spectrum values are evaluated by discriminators and result in the probabilities for all possible classes of significance. The class of significance is therefore added to the sensed signals for which the most probability is provided.

7 Claims, 11 Drawing Figures

PATENTED JUN 4 1974

3,815,090

SHEET 3 OF 4

Fig.6
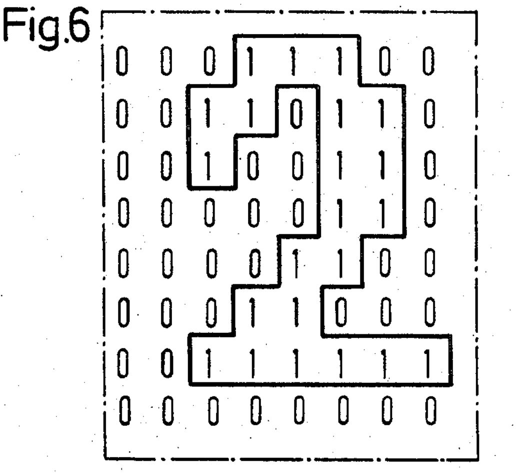
Fig.7
| | | | | |
|---|---|---|---|---|
| 22 | 0 | 4 | 14 | 6 |
| 6 | 0 | 2 | 4 | 6 |
| 8 | 2 | 8 | 6 | 4 |
| 4 | 2 | 10 | 6 | 6 |
| 8 | 2 | 6 | 4 | 4 |
Fig.8
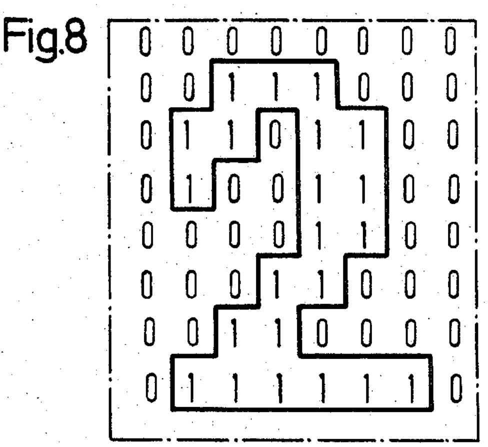
Fig.9
| | | | | |
|---|---|---|---|---|
| 22 | 0 | 4 | 14 | 6 |
| 6 | 0 | 2 | 4 | 6 |
| 8 | 2 | 8 | 6 | 4 |
| 4 | 2 | 10 | 6 | 6 |
| 8 | 2 | 6 | 4 | 4 |
Fig.10
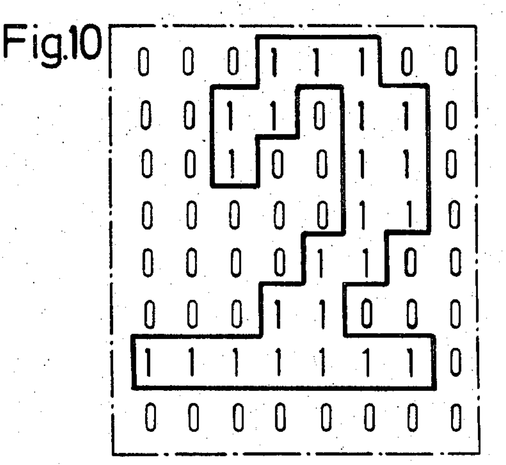
Fig.11
| | | | | |
|---|---|---|---|---|
| 23 | 1 | 5 | 13 | 7 |
| 7 | 1 | 5 | 3 | 3 |
| 9 | 3 | 7 | 7 | 3 |
| 5 | 1 | 9 | 7 | 5 |
| 9 | 1 | 5 | 3 | 5 |

METHOD AND CIRCUIT ARRANGEMENT FOR AUTOMATIC RECOGNITION OF CHARACTERS WITH THE HELP OF A TRANSLATION INVARIANT CLASSIFICATION MATRIX

BACKGROUND OF THE INVENTION

1. Field of the Invention

This invention relates to a method and apparatus for automatic recognition of characters which may vary, even within a class of significance, according to shape, size and position within a rastered and column-wise scanned scanning field, wherein the result of scanning is transformed into a translation invariant classification matrix, according to given rules in several steps, from which classification matrix a class of significance of the character to be recognized is derived with the values of the individual elements for which the highest probability is given.

2. Description of the Prior Art

A practically applicable, and therefore satisfactory method for automatically recognizing characters, must fulfill two main requirements; it must be insensitive with respect to variations and interferences. Primary magnitude and form variations can be recognized due to a finite number of admitted type of characters; they can therefore be taken into account in a corresponding manner. Character interference, however, such as line interruptions or accumulations of individual image elements at the image pattern occur purely by accident and form secondary character variations whose numbers are unlimited.

The prior art shape-feature methods for automatically recognizing characters are therefore relatively sensitive to interferences, since only a finite number of form variations, i.e. deviations of the character-to-be-sensed from certain prototypes representing a class of significance can be recognized. Statistical decision methods whereby the entire information of an image pattern is evaluated are better suited in order to differentiate between casual and accidental variations in the shape. The prior art mask or probe methods are representative of statistical decision methods and even allow an inexpensive realization; however, these methods have the drawback of being translation variant since the absolute image position must be evaluated by such methods. However, centering methods, which are additionally required for this reason, will fail with respect to interfered, mainly non-isolated characters.

In addition to the aforementioned methods, which are well known in the field of character recognition, a further method based on a statistical decision is known, wherein the result of scanning a field is intermediately stored in digital form as a scanning image matrix and whereby the signal state of the corresponding element of a transformed further scanning image matrix is derived in order to lower the redundance of this matrix, which elements correspond to one of the image elements of the field, respectively. The transformation is dependent on the state of the element itself and the respectively adjacent elements, and is done with the help of comparing matrices comprising only a few bits. This is effected with the help of different comparing matrices of equal size which are applied individually, or in successive groups, possibly several times one after the other, in such a way that step by step a further corrected matrix is derived from the preceding transformed matrix, and it is used as a basis for the next transformation step. Finally, by an $n$-th transformation an image matrix of $n$-th order is derived in such a way that its reduced image elements are only contained in a fixed section of the $n$-th matrix, which is small compared with the entire image matrix, while maintaining the essential shape elements of the sensed characters. A certain significance class is assigned to the sensed character from the signal state of the matrix elements of this section, with the help of classifiers which comprise only a few bits. The essential property of this prior art method consists in that the kind, the number and the effect of the individual transformation steps depend on the state of the elements of the sensed result itself. Thereby, the pre-processing of the scanning result of an image pattern is adapted to the state of the image pattern itself. A drawback, however, is provided in the fact that a large number of transformation steps is required in order to reduce the original sensed result to a certain classification matrix comprising only a few bits, while at the same time maintaining its essential shape elements independent of possible variations. Therefore, due to the number of transformation steps required, this does not only require a relatively great amount of technical expenditure, but also requires a great deal of time, since these transformation steps must be carried out one after the other.

Furthermore, a method for the automatic recognition of two dimensional patterns has previously been suggested, whereby mathematical momentums of such a pattern are utilized as classification features, with respect to axes, which have been selected as desired. With this method, a scanning result, which has been obtained from the pattern and which has been digitalized, is transferred without change into a first operational matrix, a so-called transformation matrix, from which the center of mass of the sensed pattern is obtained, and therefore the center momentums from its possible momentums of second order and, therefrom, the main inertia momentums, with the help of the momentums of the first order, with respect to the axes of a coordinate system provided in the scanning field. Furthermore, the scanning result is transferred into at least one further operational matrix, and therefrom momentums of second order of the pattern are obtained with respect to axes shifted or inclined with respect to the original coordinate system. All detected momentums of second order are supplied to classifiers which associate a certain class of significance with the sensed pattern and with the several obtained classification features. This suggested method is based on a purely statistical basis and utilizes the entire formation content of the sensed pattern in order to optimize the scanning result. However, it is in the nature of the momentums of desired orders of a surface with respect to a coordinate system that marginal ranges of the surface are, for example, evaluated differently than surface elements close to the coordinate origin. Due to this, it is required with this method to form momentum of equal order with respect to several coordinate systems; on the other hand, however, the calculation of these momentums is relatively expensive, even if one can transfer the calculation of the integrals to a sum calculation during a raster representation of the sensed patterns, while so obtaining sufficient accuracy of the integral calculation of the momentums.

SUMMARY OF THE INVENTION

Therefore, the invention is based on the object of providing a method and apparatus fo the automatic recognition of characters whereby a purely statistical decision method is utilized for pre-processing a scanning result obtained from the image pattern, whereby the entire information of the image pattern is evaluated, but whereby the rules on which the pre-processing is based are sufficiently simple that the transformation of the scanning result required for classification can be technically carried out by most simple means.

The foregoing object is achieved in a method of the initially mentioned kind, according to the present invention, in such a way that scanning signals obtained while the scanning field is sensed which correspond to the black value of the sensed element and are arranged according to the columns in the scanning field and are one-dimensionally transformed with a set of orthogonal Walsh functions extended by phase shifted sequences of such Walsh functions in such a way that the transformation result of such a number of scanning signals with one of these functions forms a value of a one-dimensionally transformed image matrix. The one-dimensionally transformed image matrix is again transformed in the same manner with the transposed set of applied Walsh functions into a two-dimensionally transformed image matrix. A classification matrix is formed from the last-mentioned matrix and is denoted as a sequence spectrum. Partial ranges in the two-dimensionally transformed image matrix, which are to be derived only from the phase shifted sequences of Walsh functions of equal order and which are limited by lines and columns of equal order, are combined by means of maximum value formation, and therefrom, as well as from all remaining values of the two-dimensionally transformed image matrix, absolute values are formed and transferred into the sequence spectrum as spectrum values. Combinations of these spectrum values are evaluated by means of discriminators and result in the probabilities for all possible classes of significance. The sensed character is assigned that class of significance for which highest probability is given.

It is possible through this method to obtain a translation invariant representation of the scanning result. Thereby, only simple additions or subtractions, respectively, are required for the transformations of the scanning result into the sequence spectrum. Therefore, the pre-processing is simplified with respect to the prior art methods in such a way that it would even be possible with a decrease in expense to process the image signals obtained during the scanning process without digitalization —as it is usually common—but in analog form. Furthermore, the present method is independent, in principle, from whether characters in the scanning field are sensed column-by-column or parallel. Due to this simple realization, possiblities of the transformation of the scanning result as provided, a parallel pre-processing is very well possible with a decrease in technical expense, with a parallel sensing of the entire character, so that the time required for recognizing a character is reduced to an essential degree.

BRIEF DESCRIPTION OF THE DRAWINGS

Other objects, features and advantages of the invention, its organization, construction and operation will be best understood from the following detailed description of preferred embodiments of the invention taken in conjunction with the accompanying drawings, on which:

FIG. 6 is a digitalized image pattern for a character of the class of significance "2";

FIG. 7 is a sequence spectrum associated with the character illustrated in FIG. 6; and FIGS. 8–11 are corresponding digitalized image patterns and sequence spectrums relating to the class of significance 2.

DESCRIPTION OF THE PREFERRED EMBODIMENTS

The present invention is based on the effect that it is possible to represent image patterns, position invariantly, without additional information loss with the help of a mathematical transformation. Meander-shaped functions (Walsh functions) are much better suited for such resolution of the image signals than the trigonometric functions. Their so-called sequence spectrums corresponding to the frequency spectrum of the trigonometric functions is also position invariant; the functions themselves however, are much better adapted to the conditions of raster image signals and digital processing.

First, it is advantageous to make some observations about the basis of the so-called sequence technique, before describing the exemplary embodiments. As indicated above, sequence technique, analogous to the common frequency technique, represents a data technique which applies the complete orthogonal system of the Walsh function instead of that of the trigonometric function. This system must also be complete and orthogonal. The theory of this sequence technique is known from a number of publications, such as by Walsh, J. L. "A Closed Set Of Novel Orthogonal Functions", *Amer. J. Math* 45 (1933), pages 5 through 24, or by Harmuth, H. "A Generalized Concept of Frequency and Some Applications" *IEEE Transactions on Information Theory*, Volume IT-14 (May 1968), Issue 3, Pages 375–382. Here, I will only treat specific properties which are directly essential for the understanding of this invention. First of all, referring to FIG. 2, which is specifically explained below in connection with the sample embodiments, comprises a number of Walsh functions which are represented in a standardized interval $-0.5 \leq \theta \leq +0.5$. Thereby $\theta = t/T$, the time standard to the time base T. Beyond this interval, the system continues periodically. Walsh functions can be represented in a different manner. The representations selected here proceed from a definition equation which is explained in the aforementioned essay by Harmuth. The selected representation has the advantage that the standardized sequence can be associated to an integer order parameter $i$, analogous to the standard frequency. Therefore, the system of trigonometric functions and Walsh functions can be directly compared. Analogous to sin $(i \cdot 2\pi\theta)$ and cos $(i \cdot 2\pi\theta)$, sal $(i,\theta)$ will denote the uneven Walsh functions, with respect to $\theta = 0$, and cal $(i,\theta)$ will denote the even Walsh functions.

Figure 2:
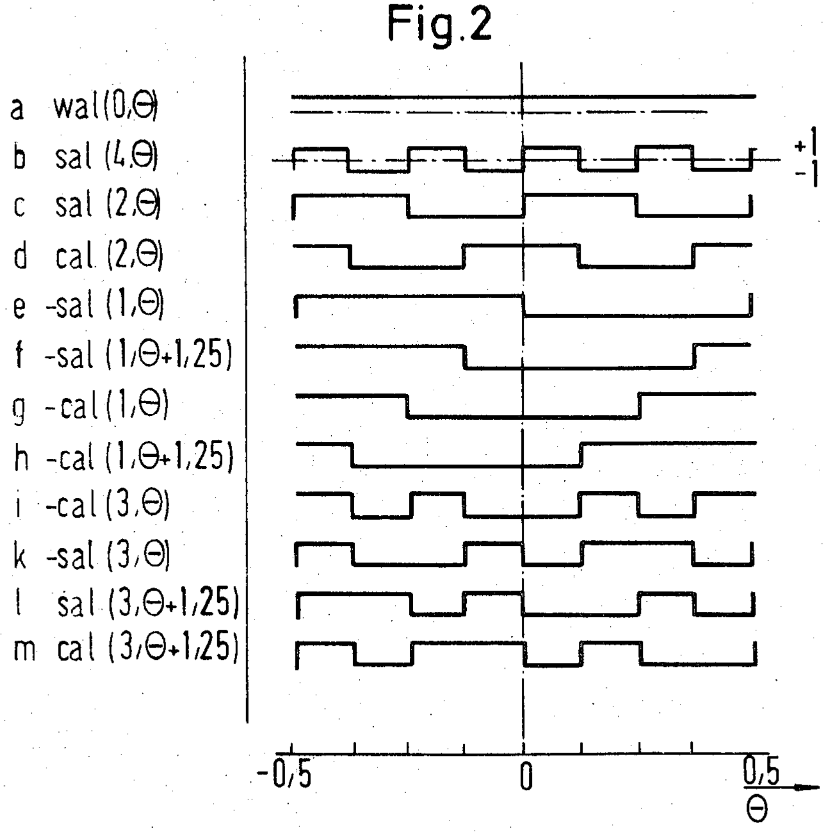
FIG. 2 is a graphical representation having curves a–m which represent a set of orthogonal Walsh functions extended by phase shifted sequences.

Such a system of functions represented in FIG. 2 may, of course, be illustrated in a matrix whose lines contain the individual sequences. For the Walsh function sal $(4,\theta)$, illustrated in the second line $b$ of FIG. 2, the corresponding 8 dimensional vector will then be $S_2 = (1,-1,1,-1,1,-1,1,-1)$. All other vectors for the sequences illustrated in FIG. 2 can be stated in a corresponding manner.

Since the Walsh functions represent an orthogonal system of functions, the so-called Hadamard matrix can be found with certain sequences. A Hadamard matrix is comprised of the binary values +1 and −1 in such a way that both its lines and its columns, respectively, represent mutually orthogonal vectors. From this, the property of each Hadamard matrix will result, corresponding to the relation $$(H) \cdot (H^{+}) = n \cdot (E) \quad (1)$$

The matrix product of the original Hadamard matrix (H) with the matrix ($H^+$) transposed thereto will result in the unit matrix (E) of the order $n$ when the Hadamard matrix (H) itself forms a system of $n$ . $n$ numbers. The equation 1 simplifies, to become the relation $$(H) \cdot (H) = n \cdot (E) \quad (1a)$$

when the Hadamard matrix is additionally symmetrical.

The use of a Hadamard transformation for image transmission is known from "The Proceedings of the I.E.E.E.", Vol. 57 No. 1, January 1967, Pages 58 through 68, representing a two dimensional image coding which can be simply coded. Thereby, a squared image matrix (B) is multiplied from left to right with a Hadamard matrix (H), and a transformed image matrix (T) is obtained, according to the relation $$(T) = (H) \cdot (B) \cdot (H) \quad (2)$$

Since the transformed image matrix (T) comprises the same entropy as the image matrix (B), it can be transmitted with the same channel capacity. The matrix multiplication will be repeated during the decoding process and will obtain the original image matrix (B), due to Equation (1$a$)—except for a factor $n^2$ corresponding to the relation $$(H) \cdot (T) \cdot (H) = (H) \cdot (H) \cdot (B) \cdot (H) \cdot (H) = n^2\,(B) \quad (3)$$

As will be shown in the following with the help of exemplary embodiments of the invention, properties of the Hadamard transformation are to be utilized in a method for the automatic recognition of characters which are based upon a two-dimensional transformation of the scanning result with the help of Walsh functions which are selected in such a way that the translation invariant evaluation is possible. An overview of this method is now given in the following with the help of FIGS. 1 and 2.

Figure 1:
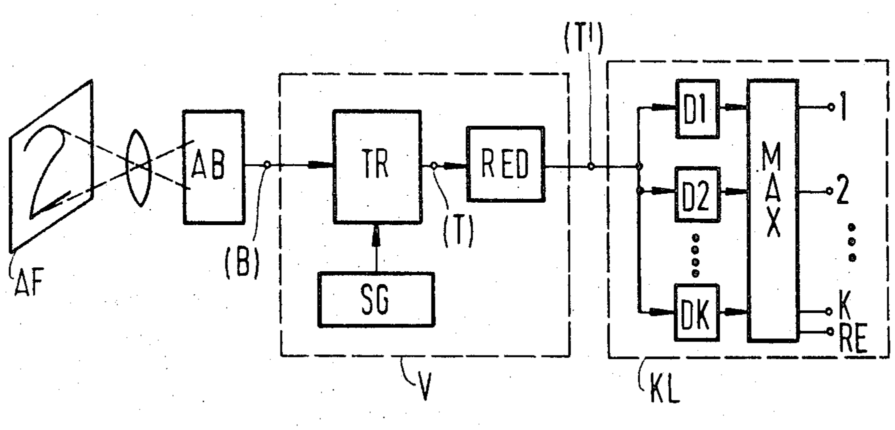
FIG. 1 is a block diagram of a character recognition system illustrating a circuit arrangement for carrying out the method of the present invention.

In FIG. 1, a character contained in a scanning field AF, or image pattern, is scanned in a common manner with column-by-column scanning by means of a scanner AB. The image signals corresponding to the individual elements of the scanning field AF represent an image matrix (B) in its entirety. For a pre-processing of the scanning result, the elements of this image matrix (B) may be transferred either in parallel or column-by-column into a pre-processing device V. The pre-processing device V contains a transformation circuit TR which, on one hand, is connected to the scanner AB by way of image signal lines and, on the other hand, is connected to a sequence generator SG.

The sequence generator SG produces the required Walsh functions. An essential difference exists in the selection of the corresponding sequences, compared with the described Hadamard transformations, in that a translation invariant transformation is required for the character recognition. If the reversibility of the transformation is waived, which can be derived from Equation 1, a sequence matrix (S) consisting of a number of $m$ sequences can be formed which consists of a set of orthogonal Walsh functions, extended over phase shifted sequences. If a scanning field AF with a raster of 8 × 8 bits is used as a basis, an image matrix (B) with 64 elements, obtained during the scanning of the scanning field AF, can be transformed with a sequence matrix (S), which is based on a set of $m = 12$ sequences as 8 dimensional line vectors. The set of Walsh functions employed for this purpose is illustrated in FIG. 2 in lines $a$–$m$. If the lines $a$ and $d$ or the lines $e$ through $h$, or the lines $i$ through $m$ are respectively compared with each other, for example, it can be seen therefrom that respective sequences of equal order $i = 1, 2$ or 3, respectively, are illustrated in these lines which, however, are phase shifted with respect to each other. It is essential for a position invariant transformation of the image matrix (B) with the help of the sequence matrix (S) and a sequence matrix ($S^+$) transposed hereto, corresponding to the relation $$(S) \cdot (B) \cdot (S^{+}) = (T) \quad (4)$$

in the fact that the sequence matrix (S) or its transponent ($S^+$) contains several mutual sequences which are only phase-shifted with respect to each other.

The scanning values, i.e. the image signals for a column of the scanning field AF, are controlled in the transformation circuit TR, according to the rules of matrix multiplication, and are added or subtracted by a sequence generator SG, and stored at the end of each column. Therefore, the one-dimensionally transformed image matrix (S) · (B) will be obtained. This process repeats in the second transformation, whereby the one-dimensionally transformed image matrix is now multiplied with the transposed sequence matrix ($S^+$). The result of this transformation is the two-dimensionally transformed image matrix (T) which—expressed in mathematical terms—forms a two-dimensional correlation of the image matrix (B) with $m$ sequences. In order to clarify the importance of the phase-shifted sequences in the sequence matrix (S), this correlation should still be further explained. If only one single column of the entire scanning field AF, which is supposed to contain an image pattern, is considered and it is furthermore assumed that the image signals corresponding to this column of the scanning field AF, or elements of the one column of the image matrix (B) coincide best with the sequence —cal (3, θ ) illustrated in the line i of FIG. 2, then the sequence sal (3, θ + 1.25), which is illustrated in line 1 of FIG. 2 would now best be correlated with the image signals of an analog of the column of the scanning field AF which is shifted one line downwardly, i.e. symmetrical multiplication would result respectively for the same value. This means, the position invariant of this transformation is due to the effect that sequences of equal order, but different phases, are comprised in the sequence matrix (S). However, in order to be able to evaluate the scanning results of an image pattern in the scanning field AF, independently from its position in the scanning field, the transformed image matrix (T) must be reduced to a so-called sequence spectrum (T′), and standardized. The reduction consists in a maximum-value formation, above the values of such partial ranges of the transformed image matrix (T) which are formed by the lines and columns associated with the phase-shifted sequences of equal order. The standardization is obtained in such a way that the absolute values of these maximum values of individual partial ranges are formed which then represent the elements of the sequence spectrum (T′).

This sequence spectrum is the result of preprocessing and is further processed in a classifier KL, connected to the pre-processing unit Z. The classifier KL contains nonlinear discriminators D1 through DK wherein the information carrying elements of the spectrum (T′), the so-called spectrum values and their combinations, with certain different factors for each class of significance, are applied. The discriminators then show the probabilities for all classes of significance. An extreme value determination of these probabilities is effected in a maximum counter connected to the discriminators, and the most probable significance is indicated, as far as it comprises a sufficient, adjustable, distance from the next probable class of significance. The required distance results from the desired ratio of the error rate to the rejection rate. If both significances do not comprise the required distance from each other with greatest probabilities, a rejection RE of the sensed image pattern is indicated.

The classification of the character was here only briefly indicated, since it can be carried out only with common means. For example, the discriminators can be computed in a simulated optimization process, according to the criterion of a minimum error rate with a representative character set according to statistical methods, for example, according to the regression analysis.

Figure 3:
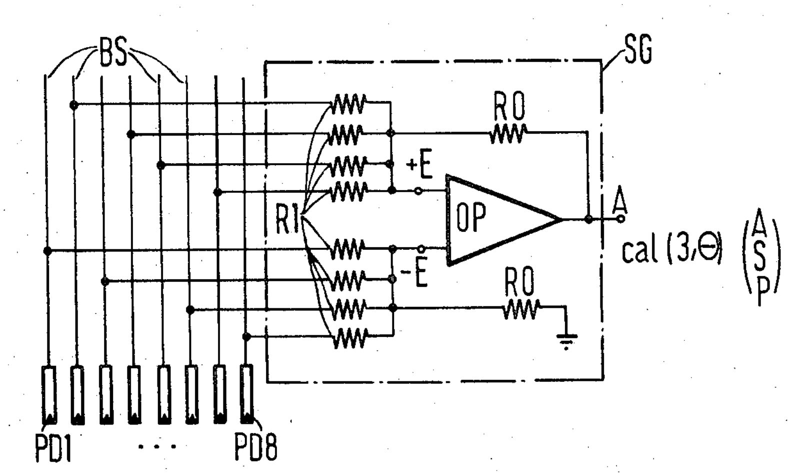
FIG. 3 is a schematic circuit diagram showing the use of an operational amplifier with an input network as a function generator for a Walsh function.

It will now be explained with the help of FIG. 3 that the transformation of the image matrix (B) into a transformed image matrix (T) can be realized in a very simple manner. Proceeding from the vector selected as an example of 8 × 8 elements in the scanning field AF, a photo diode column is illustrated in FIG. 3 comprising eight elements PD1–PD8, which permits a scanning of one column or one line of the scanning field, respectively. Each column of the scanning field AF must be correlated with all lines of the sequence matrix (S) for the one-dimensional transformation of the image matrix (B). For this purpose, a very simple sequence generator SG can be constructed. The sequence generator SG comprises an operational amplifier OP as an essential element, with a positive input +E and a negative input −E. The operational amplifier OP comprises a feedback coupling of an output A to the positive input +E by way of a resistor RO. Furthermore, the negative input −E is grounded by way of an equally large resistor RO. Both inputs +E and −E are respectively associated with a resistor network constructed of parallel connected and equally large resistors R1. If, as indicated in this case at the output A, the sequence cal ( 3, θ) is simulated with the sequence generator SG, the photo-diodes PD2, PD4, PD5 and PD7—as can be seen from a comparison with the sequence —cal (3,θ) illustrated in line *i* of FIG. 2—or the image signal lines BS connected to these diodes, must respectively be connected with a resistor R1 of the positive input network of the operational amplifier OP. Conversely, the photo-diodes PD1, PD3, PD6 and PD8 are associated with a negative input −E of the operational amplifier OP in an analogous manner. A voltage corresponding to the functions cal (3,θ) · (ASP) will then be provided at the output A, whereby ASP denotes a column of the scanning field AF.

Figure 4:
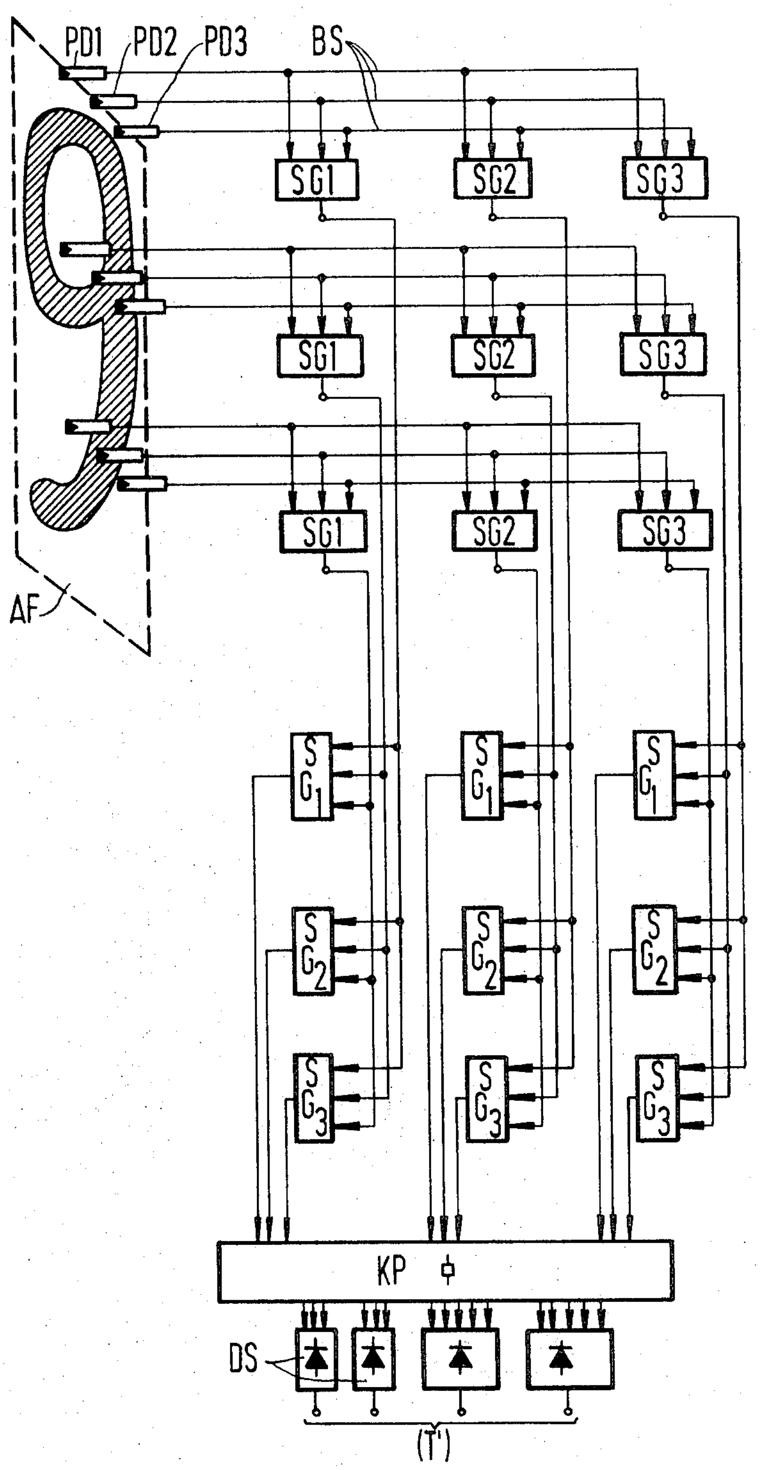
FIG. 4 is a principle circuit diagram for parallel pre-processing of the sensed character.

In FIG. 4, a pre-processing device has been illustrated which is essentially assembled of a number of such sequence generators SG*n* with the help of which a two-dimensional transformation of the image matrix (B) will be carried out. For a clearer overall view of the illustration, this example has been greatly simplified to show a 3 × 3 bit scanner and a sequence matrix (S) containing only three sequences. A practical embodiment in this simplified form would, however, provide insufficient results and it will be readily understood that a working system would be an expanded version of the given example. According to the construction of a sequence generator SGn as set forth in FIG. 3, the preprocessing device illustrated in FIG. 4 will become clear in itself. It is suited for the parallel scanning and pre-processing of all elements of the scanning field AF. Correspondingly, all elements of the image matrix (B) which are applied by way of the image signal lines BS are further processed in parallel. For this purpose, corresponding image signal lines BS are connected to the photo-diodes PD1, PD2, PD3 associated with a column of the scanning field AF and are extended in parallel toward the inputs of three sequence generators SG1, SG2 and SG3. In this sequence generator, one of the three sequences is respectively simulated according to a sequence matrix (S). This arrangement is provided respectively in parallel for all columns of the scanning field so that a one-dimensional transformation of the image matrix can be carried out three 3 × 3 sequence generators SG*n*, whereof respectively two are similarly constructed.

The outputs of these similarly constructed and equal sequence simulating sequence generators, for example SG1, are respectively connected with a set of second sequence generators for the second transformation of the image matrix (B) in the second coordinate direction, wherein again the same sequences of the original sequence matrix (S) are simulated. This simplification results from the basic rule of matrix calculations whereby the lines of the first matrix must be multiplied with the columns of the second matrix, and the further rule that the transposed sequence matrix ($S^+$) result by means of exchanging lines and columns of the sequence matrix (S). Each one of these second sequence generators SG*n* emits a signal voltage at its output which corresponds to an element of the transformed image matrix (T). These outputs are connected with diode columns DS by way of a resistor coupling field KP with the help of which an OR function is realized, so that they serve as a maxima detector.

Values of the transformed image matrix (T) can be produced with the help of the resistor coupling field KP, and they are derived from phase shifted sequences and are linearly dependent on the Hadamard spectrum. However, this example illustrates that it is possible with a large number of partially equal component groups, which, however, are simply constructed according to modern circuit techniques, to carry out a parallel transformation of the image matrix (B). This is possible, primarily due to the properties of the Walsh functions which are constructed as orthogonal functions with binary variables so that the two-dimensional transformation of the image matrix (B) can be derived or reduced to simple addition and subtraction.

Figure 5:
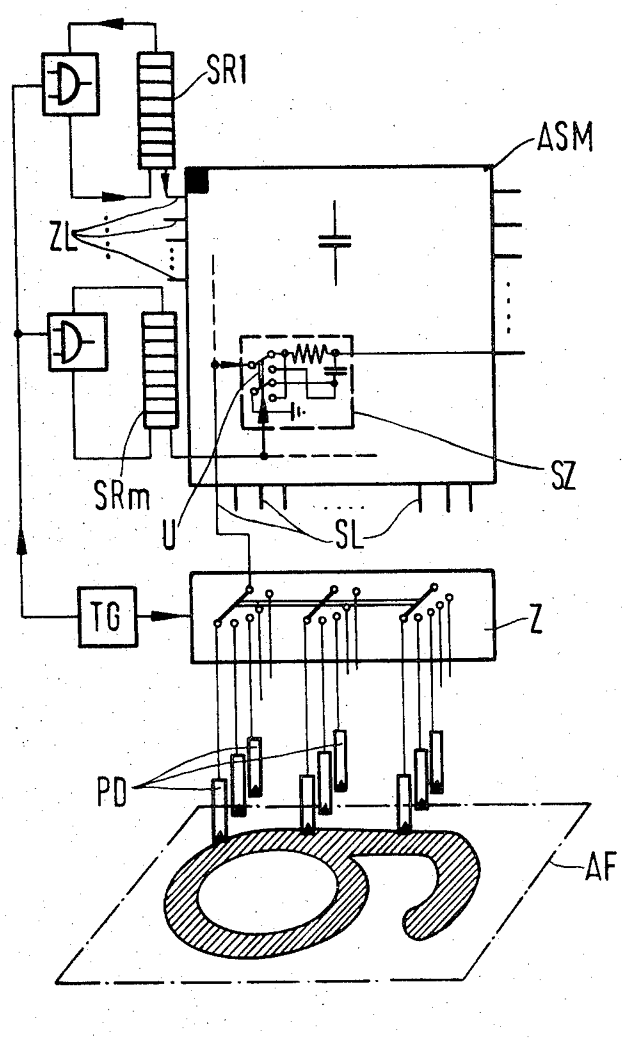
FIG. 5 is a schematic representation of a sequentially operating pre-processing unit.

The transformation of the image matrix (B), however, may also be obtained in another manner. For this purpose, another example for a possible circuit diagram has been illustrated in FIG. 5. In FIG. 5, a matrix memory ASM has been illustrated which is embodied as an analog memory, as can be seen from the exemplary illustration of a storage cell SZ which contains an RC circuit as a storage element. Each line conductor ZL of this matrix memory is respectively associated with an inversely coupled shift register SR1–SR*m* which is clock controlled by way of a central timing generator or clock TG. These clock controlled inversely coupled shift registers SR1–SR*m* respectively form a sequence generator which jointly controls all storage cells SZ of a storage line. The respective counting direction of the analog storage element of each storage cell SZ is adjusted depending on the state of the associated sequence generator. In this sample embodiment, this has been illustrated purely schematically by a two pole transfer switch U which can be embodied without difficulty as an electronic switch with the present state of the art.

An output of an associator circuit Z is respectively connected to the column conductor SL of the matrix memory ASM which is also clock controlled by means of the clock TG. In this exemplary embodiment, the associator Z, in order to indicate function, is embodied as a multi-pole switch whose switching members respectively connect a certain photo-diode PD of a photo-diode column with the associated column conductors of the matrix memory ASM. It now becomes clear that this sample embodiment is particularly well suited when the scanning process and the preprocessing are effected sequentially column-by-column. According to the complete scanning of the image pattern in the scanning field AF, the matrix memory ASM will obtain the one-dimensionally transformed image matrix (S) · (B). In a similar manner, the second transformation must then be carried out, although the same is not illustrated in FIG. 5; a two-dimensionally transformed image matrix (T) will then be reduced and standardized, as explained above with the help of FIG. 4, by way of a resistor coupling field and a diode column.

Finally, examples for mutually similar image patterns of the member 2 in its associated sequence spectrum (T′) have been illustrated in FIGS. 6–11. It should here also be briefly pointed out that the two image patterns illustrated in FIG. 6 and in FIG. 8, respectively, are identical, with the exception of a position shifting in the scanning field and, correspondingly, the two associated sequence spectrums in FIG. 7 and FIG. 9, respectively, coincide. As opposed to this, the image pattern illustrated in FIG. 10 is only similar to the other two image patterns which is clear, for example already from a comparison of the spectrum value associated with the first line and the first column of the difference sequence spectrums. This spectrum value is, as can be seen without difficulty from a mathematical observation of the matrix calculation which is the basis of the image transformation, proportional to the average black value in the scanning field. Disregarding this fact, however, it is readily apparent that, with the exception of the position invariant expressed in the sequence spectrum, similar characters may cause similar sequence spectrums.

The invention has been explained herein with the help of two exemplary embodiments which are based on a pre-processing of digitalized image signals. Disregarding the fact that a higher image resolution would be required in practice than was possible to illustrate here for reasons of simplicity and clarity, another series of possibilities must be taken into account within the scope of this invention. For example, it is possible without difficulty to admit desired analog values in an image matrix, instead of the binary values 0 and 1, and to transform such an image matrix. This direct processing of an analog image signal can avoid interferences and scanning errors. Furthermore, the selection of sequences in the described sequence matrix is, of course, not limited and can be adapted to the most different cases of applications. Even with a higher image resolution or a pre-processing of analog image signals, the advantages of the method remain, that the required transformation of the image matrix can be carried out with simple basic calculational operations and that they can be realized with the most simple component elements with the present state of the art in circuit techniques.

Although I have described my invention by reference to specific illustrative embodiments, many changes and modifications may become readily apparent to those skilled in the art without departing from the spirit and scope of the invention. I therefore intend to include within the scope of the patent warranted hereon all such changes and modifications as may reasonably and properly be included within the scope of my contribution to the art.

I claim:

1. A method for the automatic recognition of characters within a class of characters in which the individual characters are substantially identical yet differ from each other with respect to shape, size and position within a raster of a column-by-column scanning area, whereby the scanning signal produced by a scanning process are interpreted as a function of two variables which is transformed by a set of Walsh functions in several steps to result in a translation invariant classification matrix from which an identity of the character to be recognized is derived, comprising the steps of:

scanning the scanning area to obtain scanning signal corresponding to the brightness of the character elements in the scanning area;

one-dimensionally transforming the scanning signals column-by-column, according to the columns of the scanning area, with a set of orthogonal Walsh functions which have been extended over phase-shifted sequences in such a way that the result of the transformation of a column of scanning signals with one of the Walsh functions forms one of the elements of a one-dimensionally transformed image matrix;

transforming the elements of the one-dimensionally transformed matrix in the same manner with the transposed set of said Walsh functions to provide a two-dimensionally transformed image matrix;

reducing the two-dimensionally transformed image matrix by determining the element of maximum value by means of maximum detectors within corresponding partial ranges of the two-dimensionally transformed image matrix limited by lines and columns, which are referred to one of the phase-shifted sequences of equal order;

forming spectrum values of a sequence spectrum by determining absolute values of the elements of the reduced two-dimensionally transformed image matrix;

comparing combinations of spectrum values with stored reference combinations of spectrum values to obtain probabilities of the identity of the character to be recognized; and classifying said character in determining the maximum of these probabilities by means of a maximum detector.

2. Apparatus for the automatic recognition of characters which are generally the same and which may be individually varied within a class of signficance with respect to shape, size and position in a raster of columns and lines of a column-by-column scanning area, comprising:

means for scanning the scanning area column-by-column to produce signals corresponding to the brightness value of the character elements scanned;

first means including generator means for generating a set of orthogonal Walsh functions extended over phase-shift sequences and including means for providing a set of transposed Walsh functions, and responsive to said signals and said set of Walsh functions to produce a one-dimensionally transformed image matrix;

second means responsive to said image matrix and to said set of transposed Walsh functions to produce a two-dimensionally transformed image matrix;

third means for combining into a sequence spectrum partial ranges of the phase-shifted sequences of equal order, limited by lines and columns of equal order, into said two-dimensionally transformed image matrix, including means for effecting maximum value formation;

fourth means for determining absolute values from said maximum values and from the other values of the two-dimensionally transformed image matrix;

fifth means for transferring the absolute values into said sequence spectrum; and sixth means for comparing combinations of spectrum values with all possible classes of character significance to determine the class of significance of a scanned character.

3. Apparatus according to claim 2, wherein said scanning means includes scanning elements for each column; and said first means comprises a first plurality of mutually parallel adding units connected to the scanning elements of a column, each of said adding units comprising an operational amplifier having positive and negative inputs and an output, an input network connecting said positive input to a first portion of said scanning elements and said negative input to a second portion of said scanning elements for receiving therefrom digital signals upon scanning to cause said operational amplifier to provide a Walsh function at said output.

4. Apparatus according to claim 3, comprising a second plurality of said adding units, adding units of said first plurality which simulate the same Walsh functions connected to certain adding units of said second plurality to produce Walsh functions; a resistor coupling field connected to the outputs of said second plurality of adding units to form the values of said two-dimensionally transformed image matrix; and a plurality of diodes connected to said resistor coupling field in diode columns to provide maximum values of the partial ranges of said sequence spectrum.

5. Apparatus according to claim 2, wherein said scanning means includes a plurality of scanning elements for each column of the scanning area; and said apparatus comprises an analog memory having analog storing elements associated with each of said scanning elements and arranged in columns and lines; a clock producing clock pulses; means connected to said clock for connecting scanning elements of a column with the associated storage elements on a column-by-column basis in sequence in response to clock pulses; a plurality of sequence generators for providing Walsh functions connected to said clock and associated with respective lines of storage elements and sequentially operated by clock pulses; and a plurality of switching means connected between respective sequence generators and the associated lines of storage elements and operable by said sequence generators so that all storage elements of a line add and subtract the analog value stored therein and received from said scanning elements to produce a combined brightness signal value for each column.

6. Apparatus according to claim 5, wherein said sequence generators each include a feedback shift register.

7. Apparatus according to claim 5, wherein said analog storage elements each comprise an RC circuit for storing analog values received from the respective scanning elements.

* * * * *